United States Patent
Steeves

(10) Patent No.: US 12,517,751 B2
(45) Date of Patent: Jan. 6, 2026

(54) SYSTEMS AND METHODS FOR A CELLULAR NETWORK WITH A NETWORK CORE IN A CLOUD ENVIRONMENT

(71) Applicant: DISH Wireless L.L.C, Littleton, CO (US)

(72) Inventor: Daniel Steeves, Lakewood, CO (US)

(73) Assignee: DISH Wireless L.L.C., Littleton, CO (US)

( * ) Notice: Subject to any disclaimer, the term of this patent is extended or adjusted under 35 U.S.C. 154(b) by 648 days.

(21) Appl. No.: 17/939,462

(22) Filed: Sep. 7, 2022

(65) Prior Publication Data

US 2024/0078125 A1   Mar. 7, 2024

(51) Int. Cl.
   *G06F 9/455*   (2018.01)
   *H04W 84/02*   (2009.01)

(52) U.S. Cl.
   CPC ........ *G06F 9/45558* (2013.01); *H04W 84/02* (2013.01); *G06F 2009/45595* (2013.01)

(58) Field of Classification Search
   CPC ...... G06F 9/45558; G06F 2009/45595; H04W 84/02
   See application file for complete search history.

(56) References Cited

U.S. PATENT DOCUMENTS

| | | | |
|---|---|---|---|
| 2004/0044761 A1* | 3/2004 | Phillipi | H04L 67/14 709/223 |
| 2022/0171649 A1* | 6/2022 | Green | H04L 45/02 |
| 2023/0261967 A1* | 8/2023 | Padi | H04L 45/04 709/238 |
| 2023/0308385 A1* | 9/2023 | Patil | H04L 45/28 |
| 2024/0179083 A1* | 5/2024 | Trivedi | H04L 43/50 |

* cited by examiner

*Primary Examiner* — Dhaval V Patel
(74) *Attorney, Agent, or Firm* — Kilpatrick Townsend & Stockton LLP

(57) ABSTRACT

Systems, methods, and machine-readable media facilitate a cellular network. A cellular network infrastructure may be overlaid on a cloud environment so that a virtual cellular network core is integrated in a cloud environment to run a 5G core and provide 5G services. The virtual cellular network core may include a plurality of virtual routers operated as virtual machines and configured to provide functions of the 5G core. Each virtual router of the plurality of virtual routers may be communicatively connected with one or more other virtual routers of the plurality of virtual routers through an underlay infrastructure corresponding to the cloud environment. One or more component failures in the cellular network infrastructure that overlays the cloud environment may be caused. One or more operations of the virtual cellular network core may be determined consequent to the one or more component failures.

20 Claims, 6 Drawing Sheets

SYSTEMS AND METHODS FOR A CELLULAR NETWORK WITH A NETWORK CORE IN A CLOUD ENVIRONMENT

TECHNICAL FIELD

This disclosure generally relates to wireless networks, and more particularly to systems and methods for a cellular network with a network core in a cloud environment.

BACKGROUND

Cellular networks are complex and expensive to build. There is a never driving need to expand capabilities of cellular networks, while at the same time increasing their flexibility and reliability. Conventional cellular networks are lacking in their capabilities, adaptability, flexibility, and reliability. Moreover, when greater complexities are added to a cellular network, validation and management of the cellular network becomes tremendously challenging.

Thus, there is a need for systems and methods that address the foregoing problems. This and other needs are addressed by the present disclosure.

BRIEF SUMMARY

Certain embodiments disclosed in the present disclosure relates to wireless networks, and more particularly to systems and methods for a cellular network with a network core in a cloud environment.

In one aspect, a system to facilitate a cellular network is disclosed. The system may include one or more processing devices and memory communicatively coupled with and readable by the one or more processing devices and having stored therein processor-readable instructions which, when executed by the one or more processing devices, may cause the one or more processing devices to perform operations that may include one or a combination of the following. A cellular network infrastructure may be overlaid on a cloud environment so that a virtual cellular network core is integrated in a cloud environment to run a 5G core and provide 5G services. The virtual cellular network core may include a plurality of virtual routers operated as virtual machines and configured to provide functions of the 5G core. Each virtual router of the plurality of virtual routers may be communicatively connected with one or more other virtual routers of the plurality of virtual routers through an underlay infrastructure corresponding to the cloud environment. One or more component failures in the cellular network infrastructure that overlays the cloud environment may be caused. One or more operations of the virtual cellular network core may be determined consequent to the one or more component failures.

In another aspect, a method to facilitate a cellular network is disclosed. The method may include one or a combination of the following. A cellular network infrastructure may be overlaid on a cloud environment so that a virtual cellular network core is integrated in a cloud environment to run a 5G core and provide 5G services. The virtual cellular network core may include a plurality of virtual routers operated as virtual machines and configured to provide functions of the 5G core. Each virtual router of the plurality of virtual routers may be communicatively connected with one or more other virtual routers of the plurality of virtual routers through an underlay infrastructure corresponding to the cloud environment. One or more component failures in the cellular network infrastructure that overlays the cloud environment may be caused. One or more operations of the virtual cellular network core may be determined consequent to the one or more component failures.

In yet another aspect, one or more non-transitory, machine-readable media are disclosed. The one or more non-transitory, machine-readable media may have machine-readable instructions thereon which, when executed by one or more processing devices, cause the one or more processing devices to perform operations that may include one or a combination of the following. A cellular network infrastructure may be overlaid on a cloud environment so that a virtual cellular network core is integrated in a cloud environment to run a 5G core and provide 5G services. The virtual cellular network core may include a plurality of virtual routers operated as virtual machines and configured to provide functions of the 5G core. Each virtual router of the plurality of virtual routers may be communicatively connected with one or more other virtual routers of the plurality of virtual routers through an underlay infrastructure corresponding to the cloud environment. One or more component failures in the cellular network infrastructure that overlays the cloud environment may be caused. One or more operations of the virtual cellular network core may be determined consequent to the one or more component failures.

In various embodiments, a throughput tester may be used to test one or more of throughput, bandwidth, and/or order of packet delivery within the virtual cellular network core. In various embodiments, one or more 5G ORAN functions executed by the virtual cellular network core may be tested. In various embodiments, a logical path may communicatively connect a physical router to a virtual router through the underlay infrastructure corresponding to the cloud environment. In various embodiments, the one or more component failures may include one or more failures of one or more of the virtual routers of the plurality of virtual routers. In various embodiments, the one or more operations of the virtual cellular network core may correspond to routing one or more packets via a logical path from at least one virtual router of the plurality of virtual routers through the underlay infrastructure corresponding to the cloud environment to at least another virtual router of the plurality of virtual routers consequent to the one or more component failures. In various embodiments, the logical path may be an alternative to another logical path and is selected instead of the other logical path consequent to the one or more component failures.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
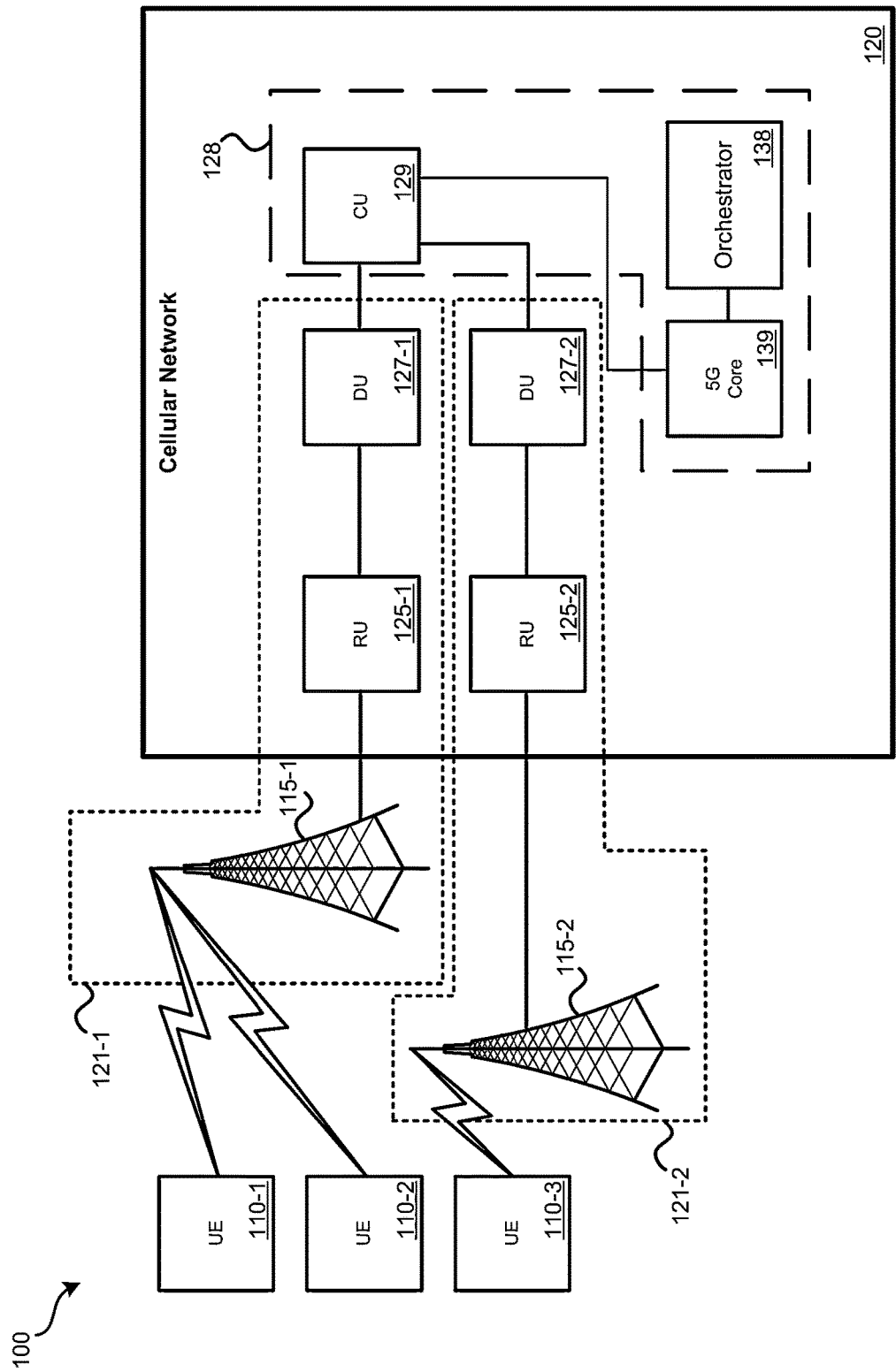
FIG. 1 illustrates a cellular network system, in accordance with disclosed embodiments of the present disclosure.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Disclosed embodiments according to the present disclosure may solve the above-mentioned problems. With the increasing agility and complexity, cellular network and methods according to the present disclosure may be flexible and responsive to changing requirements, such as high availability, high scalability, agility, and security and operations automation. Disclosed embodiments may provide for a next-generation (e.g., 5G) wireless infrastructure with an entire core (e.g., a 5G packet core) in the cloud. The infrastructure may provide for a system and network that may correspond to a next-generation (e.g., 5G) wireless infrastructure that supports phone, data, and other services, with applications and functions that support that infrastructure. For example, the infrastructure may be a virtual infrastructure and may include a specialized 5G packet core built and operated in the cloud to provide 5G services available to users. The virtual infrastructure may behave like a physical infrastructure. The system and network may integrate virtualization-native components in a cloud-native environment, where an entire cloud-native 5G packet core may be run and may provide all the compute and the components are run as virtual machines, including the functions of a 5G packet core.

Disclosed embodiments may solve problems and meet challenges of a cloud-native 5G packet core. For example, when direct access to the compute is not available due to the cloud environment, disclosed embodiments may interface with the cloud environment with operations within that environment that are unique to that environment. An entire routing architecture may be specially configured to overlay into that cloud environment. To meet the needs of 5G ORAN (Open Radio Access Network) functions, the overlay network infrastructure may provide for functions that require routing and that are not natively available with the cloud environment—e.g., border gateway protocol configurations, routing content objects with network functions that are virtual machines ultimately up in the cloud, and/or the like. Disclosed embodiments may include an entire overlay network architecture functionally built using virtual routers so that the entire routing overlay infrastructure is on top of the cloud underlayment infrastructure in order to solve limitations of the cloud and to meet capabilities required to provide full 5G ORAN phone, data, and other functions and services.

Disclosed embodiments may provide for testing of 5G ORAN functions and architectures in cloud-native environments. The equipment tested may be in the cloud, not in a private data center or a dedicated application. Test endpoints may be in the cloud. For example, disclosed embodiments may provide for operational readiness testing processes to certify the cloud-native 5G packet core. As part of building and maintaining the infrastructure, operational readiness testing processes may be executed in the cloud environment to validate that the infrastructure is reliable and meets certain requirements and functions. Every component of the environment may be tested in a virtualized manner. Every function tested may be a virtualized instance (via a virtual machine or container). The operational readiness of the virtualized functions may be tested. The testing operations of the operational readiness testing processes may include shutting virtual interfaces, shutting devices down, etc. that may correspond to breaking the environment in specific places to ensure that the infrastructure recovers appropriately. The operational readiness testing processes may ensure that virtualized platforms, including ORAN functions and architectures, can meet the needs of a non-virtualized platform.

Various embodiments will now be discussed in greater detail with reference to the accompanying figures, beginning with FIG. 1.

FIG. 1 illustrates an embodiment of a cellular network system 100 ("system 100"), in accordance with disclosed embodiments of the present disclosure. Various embodiments according to the present disclosure may include one or a combination of the components of FIG. 1 and may correspond to different variations of thereof. System 100 can include a 5G New Radio (NR) cellular network; other types of cellular networks, such as 6G, 6G, etc. may also be possible. System 100 may include: UE 110 (UE 110-1, UE 110-2, UE 110-3); base station 115; cellular network 120; radio units 125 ("RUs 125"); distributed units 127 ("DUs 127"); centralized unit 129 ("CU 129"); 5G core 139; and orchestrator 138. FIG. 1 represents a component-level view. In an open radio access network (O-RAN), because components can be implemented as specialized software executed on general-purpose hardware, except for components that need to receive and transmit RF, the functionality of the various components can be shifted among different servers. For at least some components, the hardware may be maintained by a separate cloud-service provider, to accommodate where the functionality of such components is needed.

UE 110 may represent various types of end-user devices, such as cellular phones, smartphones, cellular modems, cellular-enabled computerized devices, sensor devices, gaming devices, access points (APs), any computerized device capable of communicating via a cellular network, etc. Generally, UE can represent any type of device that has an incorporated 5G interface, such as a 5G modem. Examples can include sensor devices, Internet of Things (IoT) devices, manufacturing robots; unmanned aerial (or land-based) vehicles, network-connected vehicles, etc. Depending on the location of individual UEs, UE 110 may use RF to communicate with various base stations of cellular network 120. As illustrated, two base stations are illustrated: base station 121 can include: structure 115-1, RU 125-1, and DU 127-1. Structure 115-1 may be any structure to which one or more antennas (not illustrated) of the base station are mounted. Structure 115-1 may be a dedicated cellular tower, a building, a water tower, or any other man-made or natural structure to which one or more antennas can reasonably be mounted to provide cellular coverage to a geographic area. Similarly, base station 121-2 can include: structure 115-2, RU 125-2, and DU 127-2.

Real-world implementations of system 100 can include many (e.g., thousands) of base stations and many CUs and 5G core 139. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 61. One or more DUs, such as DU 127-1, may communicate with CU 129. Collectively, an RU, DU, and CU may create a gNodeB, which may serve as the radio access network (RAN) of cellular network 120. CU 129 can communicate with 5G core 139. The specific architecture of cellular network 120 may vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible 0-RAN implementation, DUs 127, CU 129, 5G core 139, and/or orchestrator 138 can be implemented virtually as software being executed in the cloud with the overlay network infrastructure on top of the cloud underlayment infrastructure. Therefore, depending on needs, the functionality of a DU, CU, and/or 5G core may be implemented virtually and/or specific functions of any given component can be performed by the overlay and the underlay. In the illustrated embodiment of system 100, cloud-based cellular network components 128 include CU 129, 5G core 139, and orchestrator 138. In other embodiments, the cloud-based cellular network components 128 may include one or a combination of the components. For example, the 5G core 139 may be implemented in the cloud, alone or in combination with one or more of DUs 127, CU 129, and/or orchestrator 138. Such cloud-based cellular network components 128 may be executed as specialized software executed by underlying general-purpose computer servers. In various embodiments, cloud-based cellular network components 128 may be executed with the overlay network infrastructure on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested. The overlay network infrastructure may be a virtual infrastructure and may include a specialized 5G core 139 built and operated in the cloud with virtual machines to provide 5G services using the compute resources of the underlay cloud infrastructure. The overlay network infrastructure may include a routing architecture may be specially configured to overlay into that cloud environment and may provide for functions that require routing and that are not natively available with the cloud environment—e.g., border gateway protocol configurations, routing content objects with network functions that are virtual machines ultimately up in the cloud, and/or the like.

Kubernetes, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. Rather, processing and storage capabilities of the data center would be devoted to the needed functions. When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new core function, orchestrator 138 can perform a pipeline of calling the core function code from a software repository incorporated as part of, or separate from, cellular network 120; pulling corresponding configuration files (e.g., helm charts); creating Kubernetes nodes/pods; loading the related core function containers; configuring the core function; and activating other support functions (e.g., Prometheus, instances/connections to test tools).

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed as disclosed herein.

Figure 2:
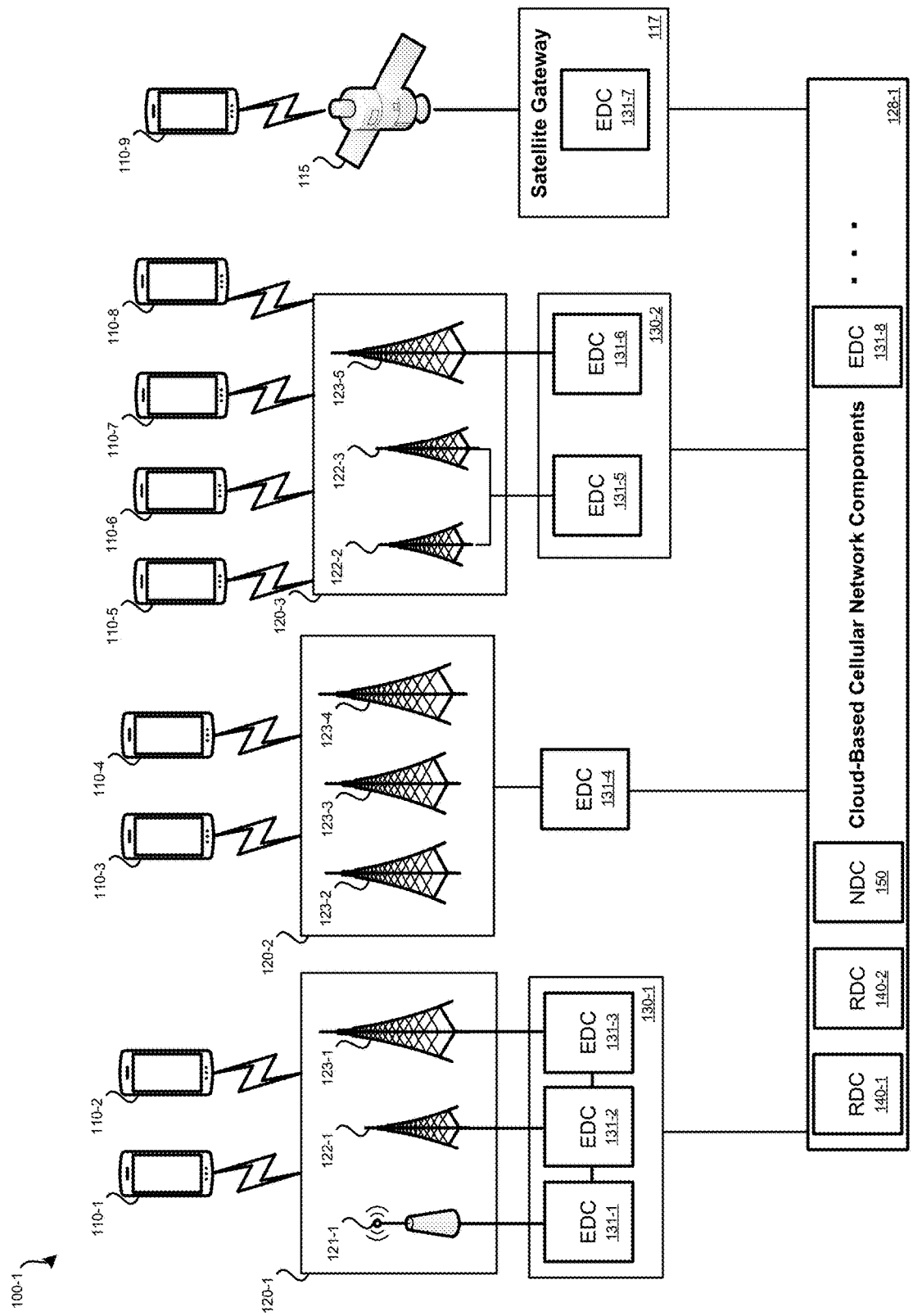
FIG. 2 illustrates the cellular network system that may include a cellular network core in the cloud, in accordance with disclosed embodiments of the present disclosure.

FIG. 2 illustrates the cellular network system 100-1 that may include a cellular network core in the cloud, in accordance with embodiments according to the present disclosure. User equipment 110-1 and user equipment 110-2, based on where they are located, may communicate with some or all of radio access network components 120-1. Radio access network components 120-1 may include local access point 121-1, small base station 122-1, and large base station 123-1 (e.g., a gNodeB in a 5G New Radio (NR) cellular network). Local access point may provide coverage to a relatively small geographic area, such as within a house or building. Small base station 122-1 may provide cellular network access over an intermediate-sized geographical region and may have a capacity to handle fewer instances of user equipment than other base stations. For instance, small base station 122-1 may be installed in an urban environment to provide access within a neighborhood. Large base station 123-1 may provide cellular network coverage to a relatively large geographic area, such as along a highway or to cover a large neighborhood. Large base station 123-1 may have a capacity to handle a greater number of instances of user equipment than a small base station.

Local access point 121-1, small base station 122-1, and large base station 123-1 may be part of a cellular network that operates according to one or more radio access technologies. For instance, the cellular network may be a 5G NR, 4G LTE, 3G, or GSM-based cellular network. Cellular networks may operate according to multiple radio access technologies. For instance, a cellular network may be a hybrid 4G, 5G, and/or later next-generation network.

Each of local access point 121-1, small base station 122-1, and large base station 123-1 may communicate with an edge data center. In some embodiments, a dedicated edge data center may be used for each component or each type of component of the radio access network. For example, edge data center 131-3 may be dedicated to large base station 123-1. In other embodiments, edge data center 131-3 may serve multiple base stations in a geographic region. edge data center 131-2 may be dedicated to small base station 122-1 or may serve multiple base stations (e.g., only small base stations or a mix of different size base stations). Similarly, edge data center 131-1 may be dedicated to local access point 121-1 or a group of local access points.

Group of edge data centers 130-1 may serve as the interface of the cellular core network and may communicate with the components of the radio access network. Edge data centers 131-1, 131-2, and 131-3 may perform some of the routing of data within the cellular core network. For example, data received by edge data center 131-2 intended for user equipment in communication with large base station 123-1 may be routed to edge data center 131-3 directly. However, not all edge data centers 131 communicate directly with each other. For instance, edge data center 131-4 may not communicate directly with edge data center 131-2. Therefore, if edge data center 131-2 is routing data to an user equipment in communication with edge data center 131-3, the data may need to be routed via another data center of the cellular core network, such as through regional data center 140-1. In this example, regional data center 140-1 serves as an intermediary node that routes data between edge data center 131-2 and edge data center 131-4.

The cloud-based cellular network components 128 may include one or a combination of breakout edge data centers 131-8, regional data centers 140, and/or national data centers 150. Such data centers may correspond to virtualized instantiations. Each regional data center 140, such as regional data center 140-1, may serve primarily to route data among different data centers. Regional data center 140-1 may be in communication with multiple edge data centers. If data is to be routed among edge data centers in direct communication with regional data center 140-1, components higher in the hierarchy of the cellular core network may not need to be involved in the routing of data. However, if data is being routed to an edge data center not in direct communication with regional data center 140-1, a component higher in the hierarchy of the cellular core network may need to be used to complete the routing.

National data center 150 may represent the highest level in the cellular network hierarchy of system 100. National data center 150 may communicate with all regional data centers 140 of the cellular core network. In turn, all of regional data centers 140 may be in communication with the edge data centers 131 of the cellular network. Such a hierarchy may allow for data anywhere within the cellular network to be routed to other devices. Edge data centers, regional data centers, and national data centers may collectively be referred to as nodes of the core cellular network.

The configuration of radio access network components 120-1 and group of edge data centers 130-1 may be replicated in various other geographic regions: user equipment 110-3 and 110-4 may communicate with radio access network components 120-2 (large base station 123-2, large base station 123-3, large base station 123-4), which communicate with edge data center 131-4; user equipment 110-5, 110-6, 110-7, and 110-8 may communicate with radio access network components 120-3 (small base station 122-2, small base station 122-3, large base station 123-5), which may communicate with group of edge data centers 130-2; etc. Group of edge data centers 130-1 (which includes edge data centers 131-1, 131-2, and 131-3) may communicate with regional data center 140-1. Group of edge data centers 130-2 (which includes edge data centers 131-5 and 131-6) may communicate with regional data center 140-2. Regional data center 140-2 may communicate with national data center 150.

In the example of system 100, only a small number of components are illustrated. In reality, the system 100 may include a much larger number of components—e.g., a much larger number of user equipment may use radio access network components 120-2 to communicate with the cellular network. Similarly, each group of radio access network components 120 may include many more local access points 121, small base stations 122, and/or large base stations 123. Fewer or greater numbers of edge data centers 131 may be present. There are fewer or greater numbers of levels within the hierarchy within the core cellular network. For example, in a cellular network if a greater number of edge data centers are present, one or more additional levels in the hierarchy below the national data center may be present.

Various numbers of edge data centers may be present in the group of edge data centers and each edge data center of group of edge data centers may not be able to communicate directly with each other. In system 100, not all wireless communication may be terrestrial. Rather, user equipment 110-9 may be a satellite modem or satellite phone that communicates via a low earth orbit (LEO), middle earth orbit (MEO), or geosynchronous earth orbit (GEO) satellite 115. The satellite 115 may relay communications between user equipment 110-9 and a satellite gateway 117, which may include or be in communication with edge data center 131-7. As a possible deviation from the hierarchy of system 100, rather than edge data center 131-7 being in communication with a regional data center, edge data center 131-7 may communicate directly with national data center 150. Therefore, for example, if data is to be routed by user equipment 110-7 to user equipment 110-1, edge data center 131-7 may route the data through national data center 150 to regional data center 140-1 to edge data center 131-2.

In system 100, every group of radio access network components may not include the same equipment. For example, group of radio access network components 120-2 may include three large base stations 123-2, 123-3, and 123-4 which may all serviced by edge data center 131-4. In the example depicted, there may be a high volume of user equipment (as represented by user equipment 110-5, user equipment 110-6, user equipment 110-7, and user equipment 110-8) communicating with group of radio access network components 120-3. Radio access network components 120-3, which includes two small base stations 122-2 and 122-3 and a single large base station 123-5, may be serviced by two edge data centers, 131-5, and 131-6 of group of edge data centers 130-2. Group of edge data centers 130-2 may have a dedicated bandwidth to communicate with cloud-based cellular network components 128-1. Therefore, it should be understood that the number and types of radio access network components that communicate with an edge data center may vary. Further, the components of the cellular core network that the edge data center communicates with may also vary.

Figure 5:
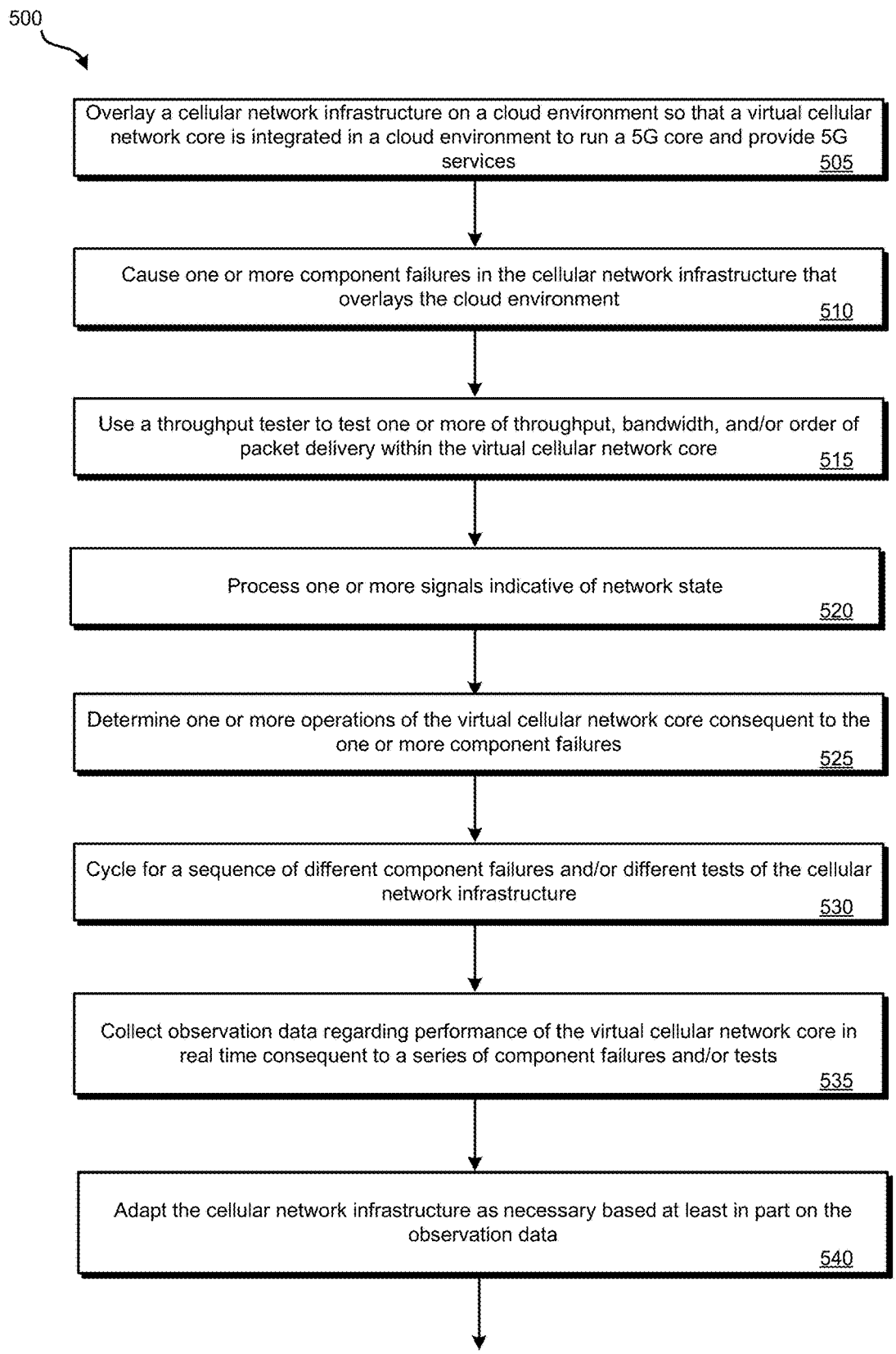
FIG. 5 illustrates a method for certain features directed to facilitating a cellular network with a network core, in accordance with disclosed embodiments of the present disclosure.

Various methods may be performed by the cellular network system 100. FIG. 5 illustrates an embodiment of a method 500 for certain features directed to facilitating a cellular network with a network core, in accordance with some example embodiments according to the present disclosure. However, teachings of the present disclosure may be implemented in a variety of configurations. As such, the order of the steps comprising the method 500 and/or other methods, processes, and operations disclosed herein may be shuffled or combined in any suitable manner and may depend on the implementation chosen. Moreover, while the following steps may be separated for the sake of description, it should be understood that certain steps may be performed simultaneously or substantially simultaneously.

As indicated by block 505, a cellular network infrastructure may be overlayed on a cloud environment so that a virtual cellular network core is integrated in a cloud environment to run a 5G core and provide 5G services. The virtual cellular network core may include a plurality of virtual routers operated as virtual machines and configured to provide functions of the 5G core. Each virtual router of the plurality of virtual routers may be communicatively connected with one or more other virtual routers of the plurality of virtual routers through an underlay infrastructure corresponding to the cloud environment, as disclosed further in reference to the following figures.

Figure 3:
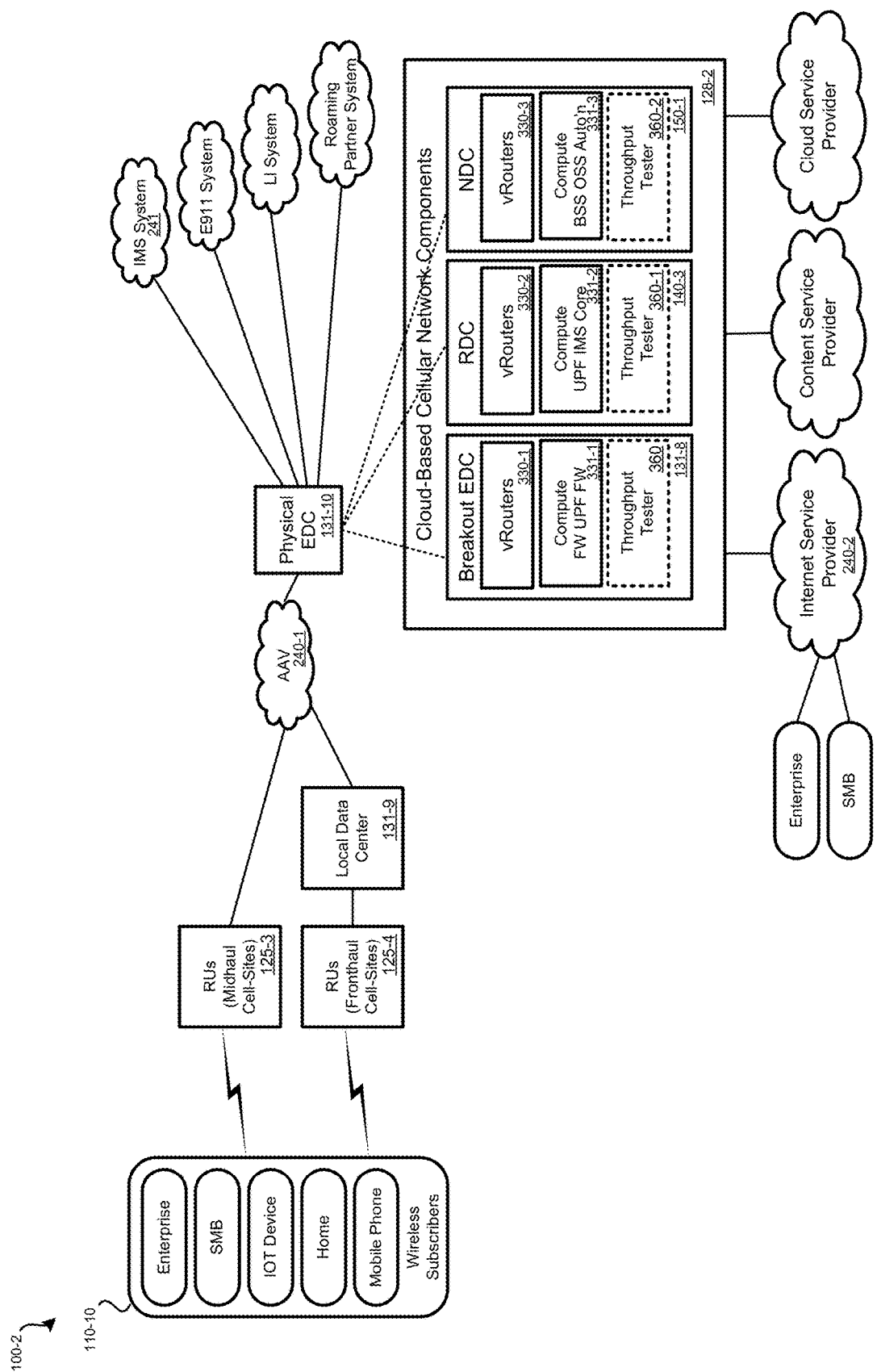
FIG. 3 illustrates various aspects of the cellular network system with a cellular network core in the cloud, in accordance with disclosed embodiments of the present disclosure.

FIG. 3 is another illustration of various aspects of the cellular network system 100-2 with a cellular network core in the cloud, in accordance with embodiments according to the present disclosure. The UE 110 may be able to communicate with the RUs 125, where, for example, communications may be converted from over-the-air to hardwired (e.g., copper, optical). The RUs 125, local data center 131-9, and edge data center 131-10 may correspond to traffic aggregation locations. The RUs 125, local data center 131-9, and edge data center 131-10 may correspond to physical locations communicating via one or more networks, such as alternative access vendors 340. The physical edge data center 131-10 may connect to the cloud, to an overlay routing infrastructure corresponding to the cloud-based cellular network components 128-2 in the cloud.

The cloud-based cellular network components 128-2 may provide the entire packet core, with breakout EDC(s) 131-8, RDC(s) 140, NDC(s) 150, virtual routers 330 and all the functions of the packet core such as packet core functions 331, for example. The overlay routing infrastructure may include all the applications of the 5G core as virtualized functions (e.g., virtual machines). The overlay routing infrastructure may include a set of ritualized functions corresponding to the virtual routers 330 (e.g., virtual machines running on the cloud). The packet core may be built as an overlay structure on the cloud underlay infrastructure using logical connections (e.g., GRE (generic routing encapsulation) tunnels). The logical connections provide connections from virtual routers 330 of the overlay infrastructure through the cloud underlay infrastructure to other virtual routers 330. As such, the logical connections between virtual routers 330 and through the cloud underlay infrastructure may facilitate the routing architecture as an overlay that uses the cloud underlay infrastructure. The overlay routing infrastructure may overlay the cloud and route the traffic between all the 5G core functions. The compute may be provided by the underlying cloud system.

In some examples, data flow from the UE 110 (e.g., cell traffic) may flow from the UE 110 to the cell site 125-3 or 125-4 to the local data 131-9 to the physical edge data center 131-10 (via the AAV 240-1 in some embodiments). In one data flow path (e.g., if the data is Internet-directed traffic), the data may flow from the physical edge data center 131-10 to the breakout EDC 131-8 by a logical connection (e.g., a GRE tunnel in some embodiments). In the breakout EDC 131-8, the data may flow to a virtual router 330-1 to a data UPF (user plane function) and then to another virtual router 330-1, through a firewall, back through the other virtual router 330-1 and then through an Internet gateway to the Internet (e.g., via ISP 240-2). Likewise, returning data from the Internet may flow in the opposite direction through a reverse path to the UE 110.

In another data flow path (e.g., if the data is a voice call traffic), the data may flow from the physical edge data center 131-10 to the RDC 140-3 by another logical connection (e.g., another GRE tunnel in some embodiments). In the RDC 140-3, the data may flow to a virtual router 330-2 to an IMS (IP multimedia subsystem) UPF and then to another virtual router 330-2, then through another logical connection (e.g., another GRE tunnel) to the NDC 150-1. In the NDC 150-1, the voice traffic may flow via a virtual router 330-3 to an IMS core, then back to the virtual router 330-3, and, from there, flow to the physical edge data center 131-10 and then to an IMS service provider system 241. Likewise, returning voice data from the IMS service provider system 241 may flow in the opposite direction through a reverse path to the UE 110.

Figure 4:
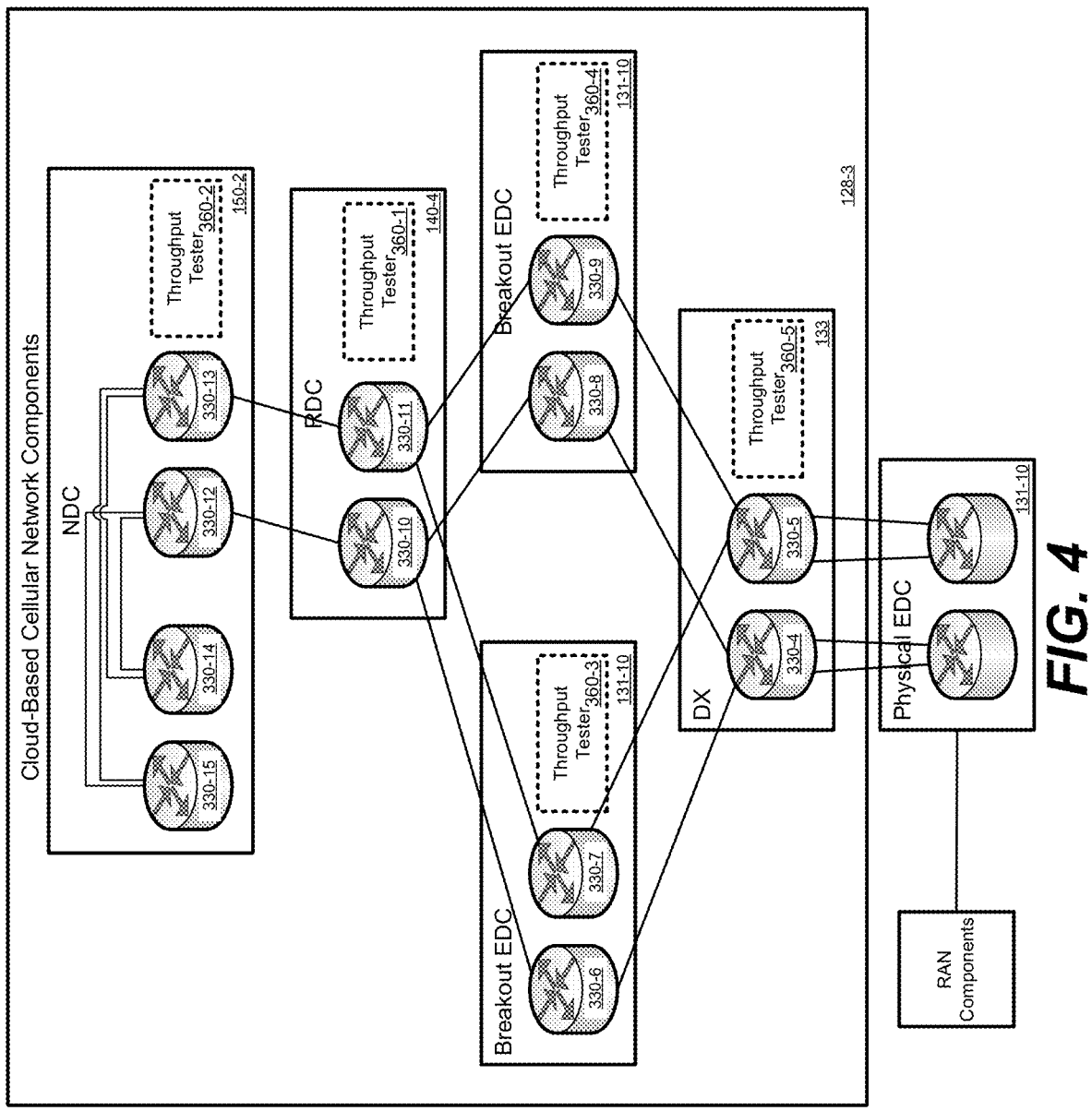
FIG. 4 illustrates various aspects involving virtual routers of the cellular network system with a cellular network core in the cloud, in accordance with disclosed embodiments of the present disclosure.

FIG. 4 is another illustration emphasizing various aspects involving the virtual routers 330 of the cellular network system 100-3 with a cellular network core in the cloud, in accordance with embodiments according to the present disclosure. The virtual routers 330 may be connected via logical connections (e.g., GRE tunnels) to one or more of the other virtual routers 330 through the cloud on the underlay infrastructure. The number of virtual routers 330 may be on the order of hundreds or thousands or more. Each virtual router 330 may be connected to each other through the cloud capacity, but the routing functions that the virtual routers 330 provide (e.g., the NFs of 5G core) are connected to those virtual routers 330.

In the illustrated example, each data center may include two or more virtual routers 330 provide for a high availability architecture. The multiplicity of virtual routers 330 may provide for redundancy of data flow to allow for continuation of service and data flow in the event of failures of one or more logical connections, one or more virtual routers 330, etc. For example, each of the NDC 150-2, RDC 140-4, breakout EDC 131-10, breakout EDC 131-11, and data exchange routing components 133 (DX router 133) may include at least two virtual routers 330. The NDC 150-2 may further include virtual routers 330-15 and 330-16, which may correspond to route reflectors. Additionally, the physical EDC 131-10 may likewise include at least two routers, which may be physical routers or virtual routers.

Such a high availability architecture with the multiplicity virtual routers 330 may not only provide redundancies to allow for continuation of service in the event of component failures, but also may provide for maximization of service. For example, under normal operating circumstances, each pair or other multiplicity of virtual routers 330 a particular stage may be load balanced. Thus, the multiple logical connections between the virtual routers 330 may normally provide for maximization of bandwidth, capacity, speed, etc. When a failure of the component is detected, the system may transition automatically from a load-balanced state to a failover state for any component failure that affects one or more virtual routers 330 and one or more corresponding logical connections. So, for example, one virtual router 330 may send packets by alternative logical paths through the cloud underlay infrastructure to another virtual router 330, etc. until connecting to applications that are connected to the virtual NFs for the 5G core.

Referring again to FIG. 5, as indicated by block 510, one or more component failures in the cellular network infrastructure that overlays the cloud environment may be caused. As indicated by block 515, a throughput tester may be used to test one or more of throughput, bandwidth, and/or order of packet delivery within the virtual cellular network core. As indicated by block 520, one or more signals indicative of network state may be processed. As indicated by block 525, one or more operations of the virtual cellular network core consequent to the one or more component failures may be determined. As indicated by block 530, the process flow may cycle back for a sequence of different component failures and/or different tests of the cellular network infrastructure. Further, as indicated by block 535, observation data regarding performance of the virtual cellular network core may be collected in real time and/or over time consequent to a series of component failures and/or tests. As indicated by block 540, the cellular network infrastructure may be adapted as necessary based at least in part on the observation data.

Various data flows, as in the examples above, may be tested in accordance with various embodiments disclosed herein. The cloud-based cellular network components 128 of the overlay infrastructure may include one or more throughput testers 360. A throughput tester 360 may correspond to a virtual machine configured to test throughput, bandwidth, order of packet delivery, and/or the like. In some embodiments, the throughput tester 360 may correspond to a test server. One or more throughput testers 360 may be installed in various places within the cloud-based 5G packet core to facilitate virtualized testing of the overlay routing infrastructure at one or a combination of various test points of the infrastructure. The one or more throughput testers 360 may facilitate the running of virtualized testing of the cloud-based 5G packet core to validate that the cloud-based 5G packet core meets operational readiness testing requirements, including capacity, bandwidth, throughput, high availability, failover operations, failback operations, and/or the like. The operational readiness testing processes may ensure that virtualized platforms, including ORAN functions and architectures, can meet the needs of a non-virtualized platform.

As disclosed herein, operational readiness testing processes may be executed in the cloud environment to validate that the infrastructure is reliable and meets certain requirements and functions. Every component of the environment may be tested in a virtualized manner. Every function tested may be a virtualized instance (via a virtual machine or container). The operational readiness of the virtualized functions may be tested. For example, every packet core function 331 and components such as firewalls, DDOS protection, VMware components, and/or the like may be tested. In some cases, when a packet comes in, it may be sent to a virtual router 330 that may be in the packet core, routed through multiple virtual routers 330, and it may drop out of one or more virtual routers 330 down to the network function that is processed, and the return traffic comes the same way all the way back through. One of those dropdowns may be connected to a throughput tester 360 to validate that the overlay capacity is there to get to the throughput tester 360 and the traffic comes back to the same bandwidth.

The testing operations of the operational readiness testing processes may include shutting virtual interfaces, shutting devices down, etc. that may correspond to breaking the environment in specific places to ensure that the infrastructure recovers appropriately. The components may be caused to fail in a sequential order along a path that is designed to be hi-availability in order to validate that the failovers work correctly and the functions continue to work and service continues. In various embodiments, the testing processes may be semi-automated or fully automated. In various embodiments, test scripts, executable code segments, programs, protocols, and/or the like may be executed by the system to perform the testing. In various embodiments, the testing processes may be initiated after all or a portion of the overlay infrastructure is built, and/or when changes are made to the overlay infrastructure such as additions and/or removals of routes, routers, data centers, UE, wireless subscribers, and/or the like.

The components that may be caused to fail may be in the overlay infrastructure, not the cloud underlay infrastructure. However, the components that may be caused to fail may also be in the physical locations (e.g., at the RUs 125, local data center 131-9, physical edge data center 131-10, and/or the like). Thus, paths from a physical router to virtual routers 330 may be tested, as well as virtual paths between virtual routers 330 to validate packet delivery, throughput, bandwidth, and/or the like. Accordingly, the testing may be executed to validate a hybrid of physical components and virtual components. The testing may be focused on the overlay capacity combined with the underlay capacity to validate meeting of throughput requirements.

Figure 6:
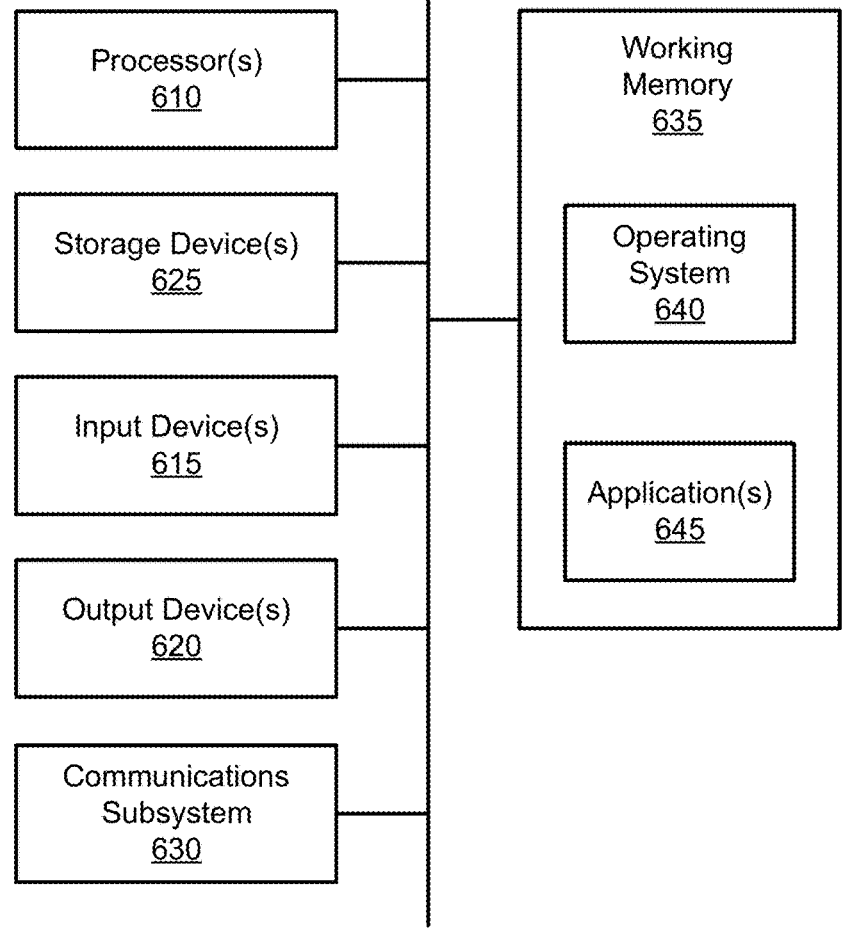
FIG. 6 illustrates a computer system that can perform various operations in accordance with disclosed embodiments of the present disclosure.

A computer system as illustrated in FIG. 6 may be incorporated as part of the computerized devices that may be used to build, instantiate, configure, test, adapt, operate, control, and/or modify the cellular network infrastructures and/or components thereof. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, video decoders, and/or the like); one or more input devices 615, which can include without limitation a mouse, a keyboard, remote control, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data storages, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general-purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "machine-readable media," "computer-readable storage medium," "computer-readable storage media," "computer-readable medium," "computer-readable media," "processor-readable medium," "processor-readable media," and/or like terms as used herein, refer to any medium that participates in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system to facilitate a cellular network, the system comprising:
   one or more processing devices; and
   memory communicatively coupled with and readable by the one or more processing devices and having stored therein processor-readable instructions which, when executed by the one or more processing devices, cause the one or more processing devices to perform operations comprising:
      overlaying a cellular network infrastructure on a cloud environment so that a virtual cellular network core is integrated in a cloud environment to run a 5G core and provide 5G services, where:
the virtual cellular network core comprises a plurality of virtual routers operated as virtual machines and configured to provide functions of the 5G core;
each virtual router of the plurality of virtual routers is communicatively connected with one or more other virtual routers of the plurality of virtual routers through an underlay infrastructure corresponding to the cloud environment;
to facilitate a testing process, actively causing one or more component failures in the cellular network infrastructure that overlays the cloud environment; and
determining one or more operations of the virtual cellular network core consequent to the one or more component failures.

2. The system to facilitate a cellular network as recited in claim 1, the operations further comprising:
using a throughput tester to test one or more of throughput, bandwidth, and/or order of packet delivery within the virtual cellular network core.

3. The system to facilitate a cellular network as recited in claim 1, the operations further comprising:
testing one or more 5G ORAN functions executed by the virtual cellular network core.

4. The system to facilitate a cellular network as recited in claim 1, where a logical path communicatively connects a physical router to a virtual router through the underlay infrastructure corresponding to the cloud environment.

5. The system to facilitate a cellular network as recited in claim 1, where the one or more component failures comprise one or more failures of one or more of the virtual routers of the plurality of virtual routers.

6. The system to facilitate a cellular network as recited in claim 1, where the one or more operations of the virtual cellular network core corresponds to routing one or more packets via a logical path from at least one virtual router of the plurality of virtual routers through the underlay infrastructure corresponding to the cloud environment to at least another virtual router of the plurality of virtual routers consequent to the one or more component failures.

7. The system to facilitate a cellular network as recited in claim 6, where the logical path is an alternative to another logical path and is selected instead of the other logical path consequent to the one or more component failures.

8. A method for a cellular network, the method comprising:
overlaying a cellular network infrastructure on a cloud environment so that a virtual cellular network core is integrated in a cloud environment to run a 5G core and provide 5G services, where:
the virtual cellular network core comprises a plurality of virtual routers operated as virtual machines and configured to provide functions of the 5G core;
each virtual router of the plurality of virtual routers is communicatively connected with one or more other virtual routers of the plurality of virtual routers through an underlay infrastructure corresponding to the cloud environment;
to facilitate a testing process, actively causing one or more component failures in the cellular network infrastructure that overlays the cloud environment; and
determining one or more operations of the virtual cellular network core consequent to the one or more component failures.

9. The method for a cellular network as recited in claim 8, further comprising:
using a throughput tester to test one or more of throughput, bandwidth, and/or order of packet delivery within the virtual cellular network core.

10. The method for a cellular network as recited in claim 8, further comprising:
testing one or more 5G ORAN functions executed by the virtual cellular network core.

11. The method for a cellular network as recited in claim 8, where a logical path communicatively connects a physical router to a virtual router through the underlay infrastructure corresponding to the cloud environment.

12. The method for a cellular network as recited in claim 8, where the one or more component failures comprise one or more failures of one or more of the virtual routers of the plurality of virtual routers.

13. The method for a cellular network as recited in claim 8, where the one or more operations of the virtual cellular network core corresponds to routing one or more packets via a logical path from at least one virtual router of the plurality of virtual routers through the underlay infrastructure corresponding to the cloud environment to at least another virtual router of the plurality of virtual routers consequent to the one or more component failures.

14. The method for a cellular network as recited in claim 13, where the logical path is an alternative to another logical path and is selected instead of the other logical path consequent to the one or more component failures.

15. One or more non-transitory, machine-readable media having machine-readable instructions thereon which, when executed by one or more processing devices, cause a system to perform operations comprising:
overlaying a cellular network infrastructure on a cloud environment so that a virtual cellular network core is integrated in a cloud environment to run a 5G core and provide 5G services, where:
the virtual cellular network core comprises a plurality of virtual routers operated as virtual machines and configured to provide functions of the 5G core;
each virtual router of the plurality of virtual routers is communicatively connected with one or more other virtual routers of the plurality of virtual routers through an underlay infrastructure corresponding to the cloud environment;
to facilitate a testing process, actively causing one or more component failures in the cellular network infrastructure that overlays the cloud environment; and
determining one or more operations of the virtual cellular network core consequent to the one or more component failures.

16. The one or more non-transitory, machine-readable media as recited in claim 15, the operations further comprising:
using a throughput tester to test one or more of throughput, bandwidth, and/or order of packet delivery within the virtual cellular network core.

17. The one or more non-transitory, machine-readable media as recited in claim 15, the operations further comprising:
testing one or more 5G ORAN functions executed by the virtual cellular network core.

18. The one or more non-transitory, machine-readable media as recited in claim 15, where a logical path communicatively connects a physical router to a virtual router through the underlay infrastructure corresponding to the cloud environment.

19. The one or more non-transitory, machine-readable media as recited in claim 15, where the one or more component failures comprise one or more failures of one or more of the virtual routers of the plurality of virtual routers.

20. The one or more non-transitory, machine-readable media as recited in claim 15, where the one or more operations of the virtual cellular network core corresponds to routing one or more packets via a logical path from at least one virtual router of the plurality of virtual routers through the underlay infrastructure corresponding to the cloud environment to at least another virtual router of the plurality of virtual routers consequent to the one or more component failures.

* * * * *